US005760301A

United States Patent [19]

Shuman, Jr.

[11] Patent Number: 5,760,301

[45] Date of Patent: Jun. 2, 1998

[54] FLOW METER FOR A GAS PRESSURE REGULATOR

[75] Inventor: Clyde W. Shuman, Jr., Schnecksville, Pa.

[73] Assignee: Precision Medical, Inc., Northampton, Pa.

[21] Appl. No.: 780,806

[22] Filed: Jan. 9, 1997

[51] Int. Cl.$^{6}$ .......... G01F 15/02

[52] U.S. Cl. .......... 73/199; 73/861.52

[58] Field of Search .......... 73/199, 861, 861.49, 73/861.52, 700; 137/487, 497

[56] References Cited

U.S. PATENT DOCUMENTS

| | | | |
|---|---|---|---|
| 2,687,144 | 8/1954 | Rafferty | 73/199 |
| 3,221,550 | 12/1965 | Yashima | 73/199 |
| 3,377,856 | 4/1968 | Hasegawa | 73/199 |
| 3,633,416 | 1/1972 | Van Dyke | 73/199 |
| 4,096,746 | 6/1978 | Wilson et al. | 73/861.52 |
| 4,366,947 | 1/1983 | Voege | 251/206 |
| 4,572,477 | 2/1986 | Phlipot et al. | 251/285 |
| 4,643,215 | 2/1987 | Phlipot et al. | 137/15 |
| 4,655,246 | 4/1987 | Phlipot et al. | 137/505.11 |

OTHER PUBLICATIONS

Drawing identified as Part Nos. 502030 and released for production. (no date).

*Primary Examiner*—Elizabeth L. Dougherty
*Assistant Examiner*—Max H. Noori
*Attorney, Agent, or Firm*—Eckert Seamans Cherin & Mellott

[57] ABSTRACT

A gas pressure regulator includes a pressure regulator for connection to a source of high pressure gas, and flow meter or flow regulator that selectively varies the flow rate of delivered gas. The flow meter includes a ring with orifices of varying sizes radially spaced about a ring, with each orifice corresponding to a predetermined flow rate. A manually rotatable cap has a central axial bore and a spool extends through the aperture in both the ring and the central bore of the cap to secure them to the base of the flow meter. The spool has a shoulder which engages the ring to limit longitudinal displacement thereof. The spool also includes at least one bore extending through the shoulder. The bore communicates on one side with the delivered gas of the flow meter and on the other side with a nozzle extending along the axis from the end of the flow meter. Gas is delivered at the selected flow rate directly from the end of the flow meter, rather than from a transverse side.

15 Claims, 4 Drawing Sheets

FLOW METER FOR A GAS PRESSURE REGULATOR

BACKGROUND OF THE INVENTION

1. Field of the Invention

This invention relates to devices for controlling the pressure and flow of pressurized gas, such as oxygen, and more particularly, to a flow regulator or flow meter of compact design for a gas pressure regulator.

2. Background

Pressure regulators are often used in conjunction with cylinders or other sources of pressurized gas, such as oxygen. Such pressure regulators generally include a portion which connects to a source of gas at relatively high pressure and delivers the gas at a predetermined, generally lower pressure. Such gas pressure regulators often include a flow regulator or flow meter which receives the gas at the generally lower pressure and allows the flow rate of the delivered gas to be selectively varied for properly metering out the gas. Compact gas cylinders with which the pressure regulators are used as described often hold the gas under relatively high pressure, for example about 500 to 3,000 psi.

Gas pressure regulators find use in a variety of medical applications, such as emergency treatment, and hospital and clinical uses. Regulators can be included in the gas delivery apparatus used by ambulatory medical patients, in nursing facilities, and in homecare environments, etc.

In some medical or commercial applications, the gas is advantageously delivered at a constant flow rate. There also may be a need for different flow rates for different applications. Accordingly, flow meters are often an essential part of the pressure regulator or gas delivery apparatus.

It is often desirable for flow meters and the associated pressure regulators to be compact, especially when they are used in conjunction with compact high pressure gas cylinders. Conventional gas pressure regulators, such as that disclosed in U.S. Pat. No. 4,655,246, may have a length or "footprint" that is relatively long, e.g., of substantial length compared to the dimensions of tanks to which they attach. A protruding regulator is disadvantageous and subject to damage. The amount of material used in conventional gas regulators and their resulting length, may be considered necessary to obtain the ruggedness required for safe and effective operation. The amount of material used in pressure regulators also contributes to increased weight of the regulator, which is especially disadvantageous when the regulator is used in an ambulatory or other mobile setting.

Particularly when a pressure regulator is connected to a compact cylinder, it is disadvantageous for the regulator to be extend farther than the radius of the cylinder. If the cylinder tips over, the regulator may strike an unyielding surface and be damaged. A protruding regulator is more likely than a compact regulator to be snagged in passing, also leading to the cylinder tipping over. The flow of gas from the regulator may also be interrupted or the operation of the regulator altered as a result of such mishandling of the gas delivery apparatus.

Excessive length and weight of the pressure regulator also raises the center of gravity of the combination gas cylinder/pressure regulator. Typically the regulator protrudes laterally from a centerline at the neck of the cylinder, such that the center of gravity of the combination is displaced laterally from the centerline of the cylinder, which typically rests on a flat surface. These aspects can make the apparatus difficult to manipulate, and make the cylinder/pressure regulator combination further prone to tipping over and damage.

Pressure regulators often have flow meters enabling a user to set the flow rate of the gas for a particular application. Flow meters of the current art, for example as disclosed in U.S. Pat. Nos. 4,655,246 and 4,643,215, can have rotatable knobs by which a selected one of a series of orifices is inserted into the flow of gas. The orifices, which are of different sizes, restrict the flow by different amounts to permit selection of a desired flow rate. The knob in flow meters of this type is disposed at the end of the pressure regulator. Gas at the selected flow rate exits transversely from an orifice in the side of the flow meter. The orifice is located on the side of the pressure regulator interior to the knob.

Delivery of the desired flow rate from the transverse side of the flow meter adds to the length of the flow meter in that the flow meter must be sufficiently long to accommodate the orifice and its associated fitting along the flow meter's length. Delivery of the desired flow rate transversely tends to complicate connection of hoses or gas delivery lines to equipment or patients. For example, it may be desirable to couple such lines to a destination on the opposite side of the regulator from the transversely oriented orifice. To avoid entanglement or kinking of the gas delivery lines emanating from the transverse orifice, it may be necessary to reorient the gas delivery apparatus or the pressure regulator, or relocate the equipment or patient to which the gas lines are connected.

Accordingly, there is a need for a gas pressure regulator with a relatively compact flow meter, namely to minimize the extension of the regulator and flow meter from their coupling to a cylinder or other tank.

There is a further need for a gas pressure regulator wherein the flow meter delivers the desired flow rate out of the regulator at a location which is easily accessible without repositioning of the associated gas delivery apparatus, preferably directly along the extension of the regulator/flow meter.

SUMMARY OF THE INVENTION

It is an object of the invention to provide a gas pressure regulator which includes a substantially cylindrical regulator portion for connecting at one end to a source of pressurized gas, and for delivering such gas at a predetermined generally-lower pressure at a second or opposite end. The gas pressure regulator also includes a substantially cylindrical flow meter or flow rate regulator from which the flow rate of the delivered gas can be selectively varied by a manual adjustment. The flow meter has an inlet end secured to the second end of the regulator portion of the gas pressure regulator. Opposite the inlet end is an outlet end, and the flow meter has a central longitudinal axis extending between the ends. Each of the ends has a generally transverse end surface. A passage extends through the flow meter between the inlet end and the outlet end and terminates in an orifice located on the end surface at the outlet end.

According to one aspect of the invention, the regulator portion and the flow meter of the regulator are secured to each other co-axially so that the flow meter extends outwardly from the regulator portion in the longitudinal direction.

According to another inventive aspect, the flow meter includes a spool with a central longitudinal spool axis. The spool is secured at its first end to the outlet end of the flow meter. A second or opposite end of the spool extends from the outlet end and terminates in a nozzle. The spool includes a shoulder between the spool ends, and the shoulder extends radially outwardly from the longitudinal spool axis. A bore extends through the shoulder of the spool and is part of the passage extending between the inlet end and the outlet end of the flow meter.

According to another inventive aspect, the shoulder concludes at a transverse wall. The transverse wall abuts a rotatable ring which is used selectively to vary the flow rate of the flow meter. By abutting the ring, the transverse wall prevents longitudinal movement of the ring.

According to still another aspect of the invention, a flow meter comprises a plurality of components having generally circular cross sections with the components co-axially positioned in relation to each other to define a central longitudinal axis for the flow meter. The components include a base, a ring located longitudinally adjacent to the base, a cap adjacent to the ring, and a spool secured to the base. The ring is rotatable relative to the base and is biased or held against the base by means of either a spring interposed between the cap and the ring, or the shoulder of the spool engaging the ring.

BRIEF DESCRIPTION OF THE DRAWINGS

There are shown in the drawings exemplary embodiments of the invention as presently preferred. It should be understood that the invention is not limited to the embodiments disclosed and is capable of variation within the scope of the appended claims. In the drawings.

DETAILED DESCRIPTION OF THE PREFERRED EMBODIMENTS

Figure 1:
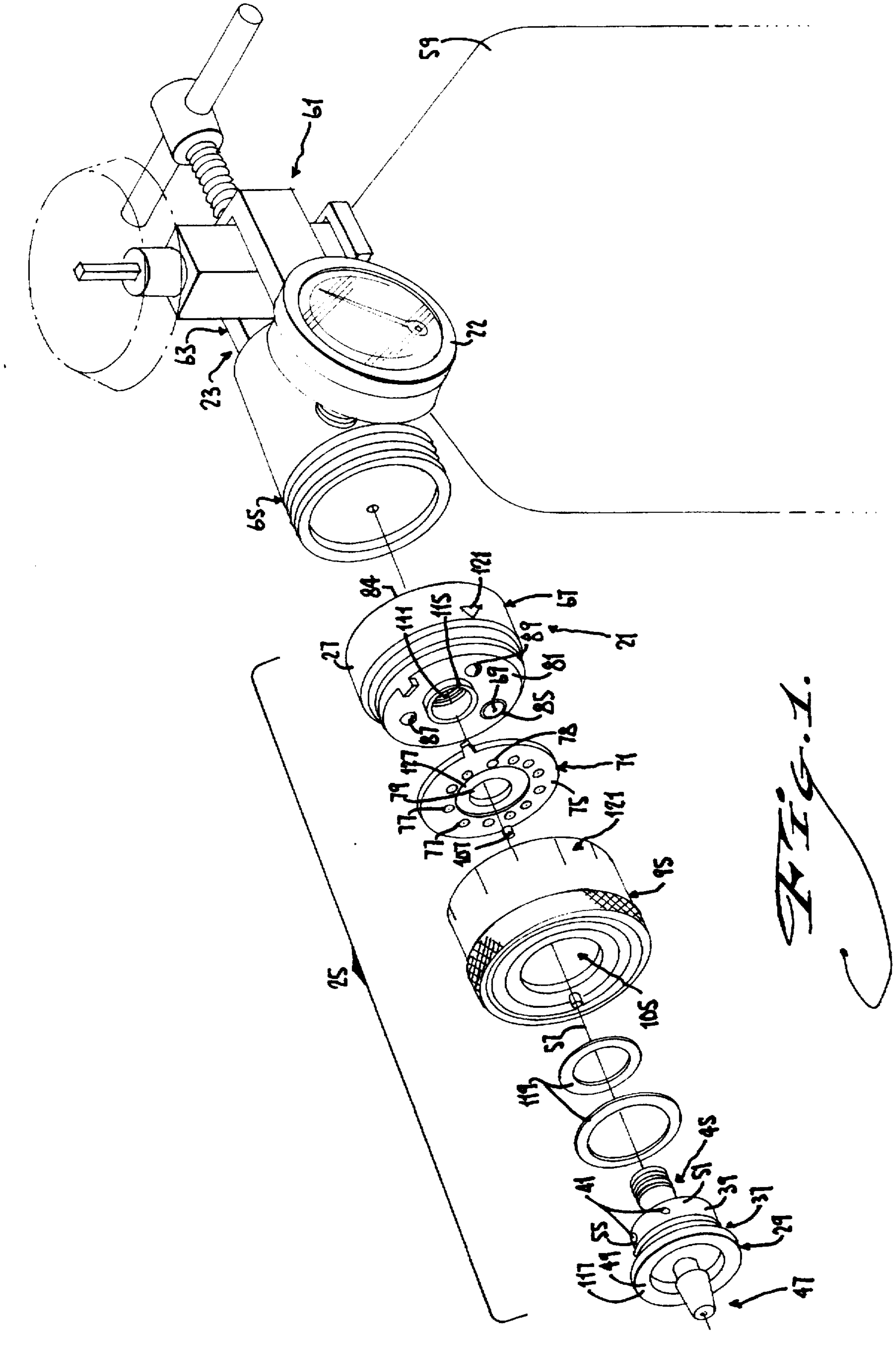
FIG. 1 is an exploded perspective view of a gas pressure regulator incorporating the principles of the present invention.
Figure 2:
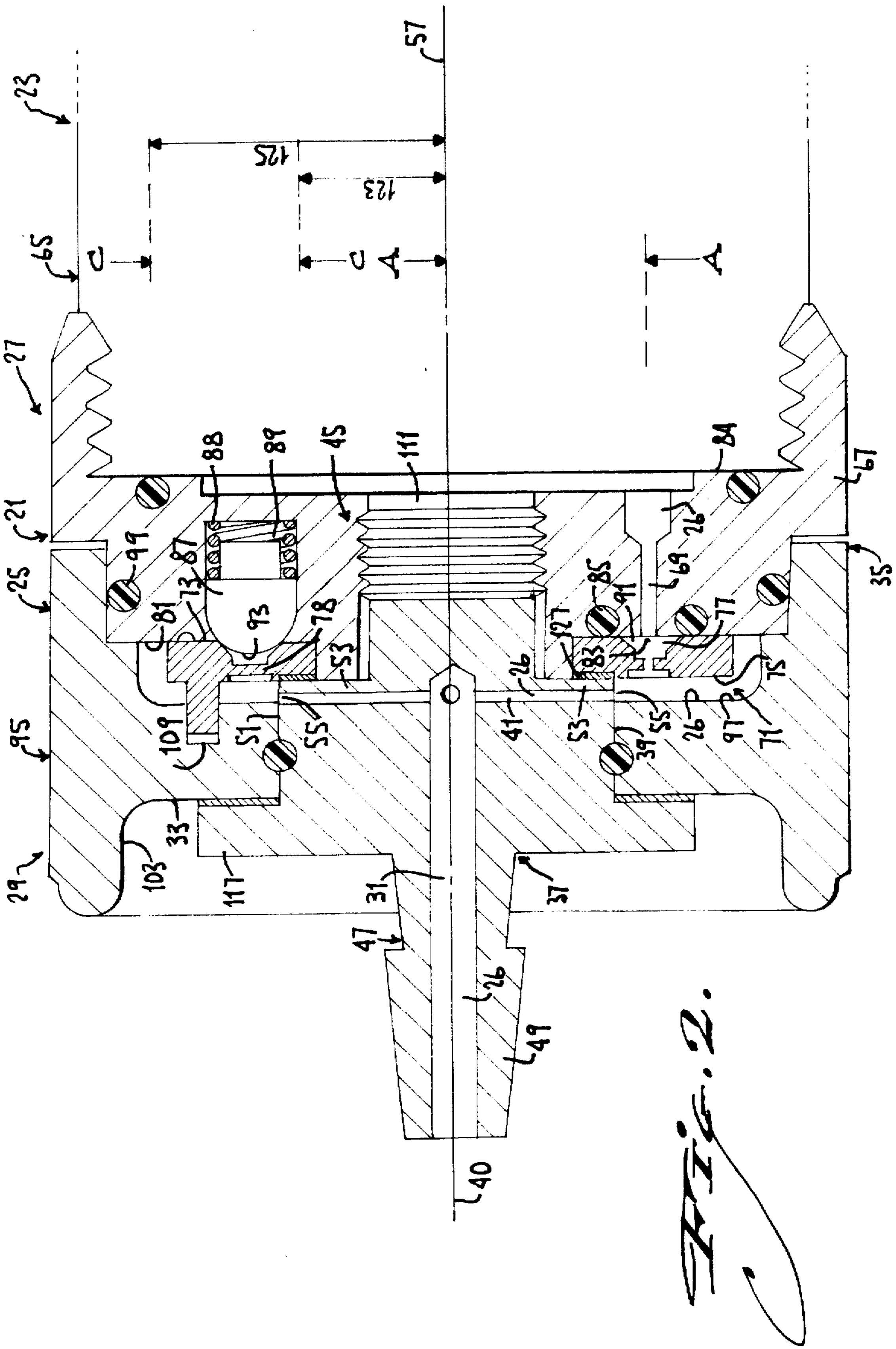
FIG. 2 is a side, sectional view of the flow meter of the regulator shown in FIG. 1.
Figure 3:
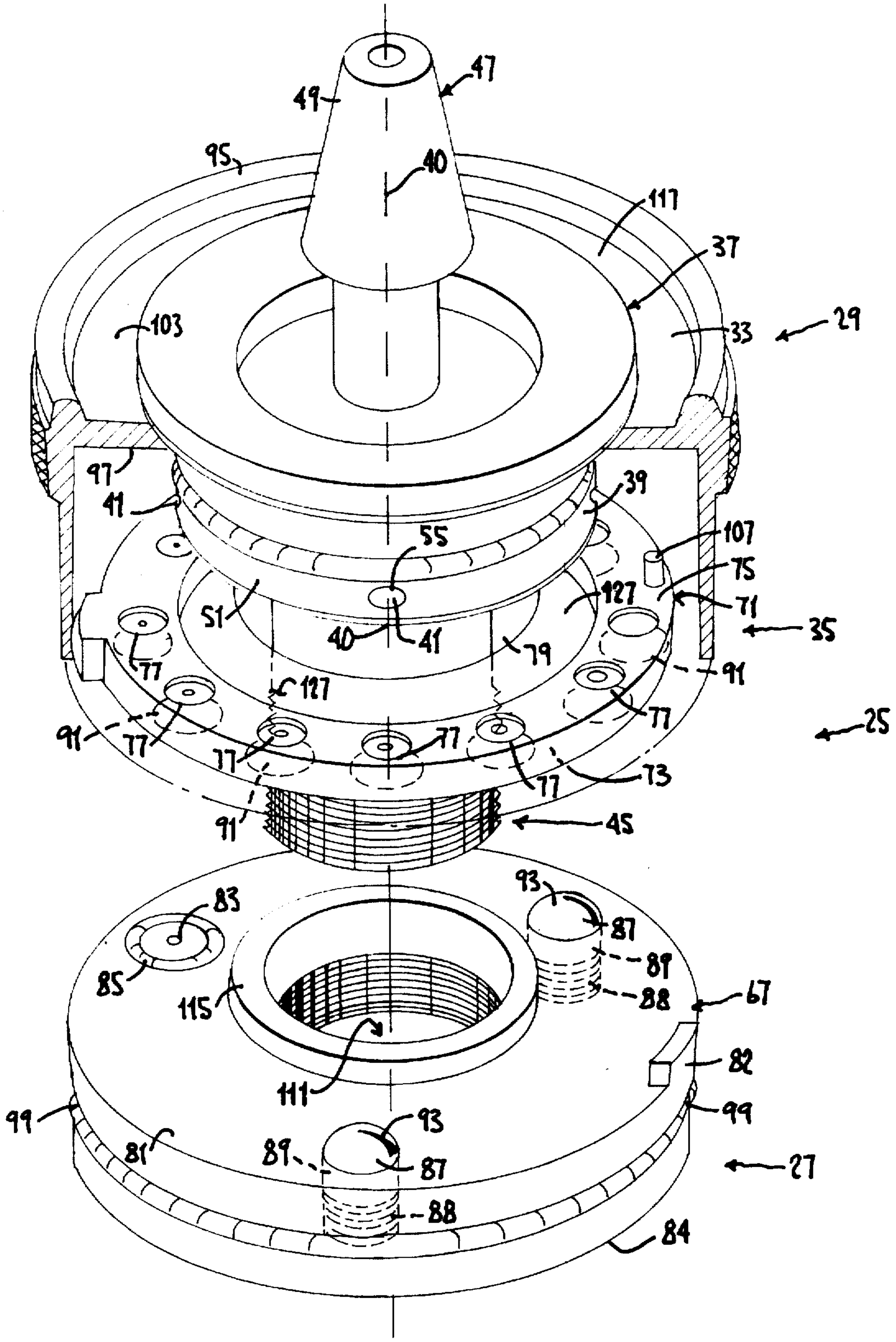
FIG. 3 is an exploded perspective view of the flow meter of FIG. 2 with portions shown cut away.

Referring now to the drawings, and particularly to FIGS. 1–3, a gas pressure regulator 21 includes a cylindrical regulator portion 23 and a rate-of-flow regulator or flow meter 25 connected to and in communication with regulator portion 23. Flow meter 25 has various portions described below which define a passage 26 extending through flow meter 25 between its inlet end 27 and its outlet end 29. Passage 26 terminates in an orifice or bore 31 which is located on end surface 33 of the outlet end 29 (FIG. 3). In this way, gas is delivered in-line at a desired flow rate directly from the end of flow meter 25, particularly from end surface 33 rather than from the peripheral sidewall 35 of flow meter 25.

Flow meter 25 includes a specially adapted spool 37 which is secured to flow meter 25 at the outlet end 29. The spool 37 includes a shoulder 39 which extends radially outwardly from a longitudinal spool axis 40 and is located between first and second opposite spool ends 45, 47. First spool end 45 is threadably received at outlet end 29 and second spool end 47 terminates in a nozzle 49 which is appropriately formed to engage a connecting line (not shown). The particular structure of the nozzle as shown is exemplary.

Shoulder 39 has a transverse wall 53 which extends generally transversely relative to spool axis 40 and terminates at its radially outer end in a peripheral sidewall 51. A plurality of bores 41 (two of four being shown in FIGS. 1 and 2) extend radially from spool axis 40 to peripheral sidewall 51 and terminate in circumferentially spaced peripheral openings 55 on peripheral sidewall 51. As best seen in FIG. 2, bores 41 are part of the gas flow passage defined between the opposite ends 27, 29 of flow meter 25 and are in communication with orifice 31 at end 29 thereof. In this way, spool 37 directs the gas to exit flow meter 25 from end 29 rather than from peripheral sidewall 35.

Flow meter 25 and regulator portion 23 are preferably secured to each other coaxially about a central longitudinal axis 57. As such, flow meter 25 extends from regulator portion 23 in a longitudinal direction. As shown in FIG. 1, gas pressure regulator 21 connects to a source of pressurized gas such as gas cylinder 59, at the end opposite flow meter 25. Gas pressure regulator 21 can be equipped with a pressure gauge 22. The regulator portion 23 includes means, shown generally as yoke assembly 61, for connecting to gas cylinder 59 and receiving pressurized gas therefrom. Pressurized gas enters regulator portion 23 at yoke end 63 at substantially the same pressure as the gas in cylinder 59. The gas pressure is regulated by some form of flow restriction or the like as known in the art, to deliver the gas at a predetermined pressure at opposite end 65 of the regulator portion 23.

Flow meter 25 is removably secured to the threaded end 65 of regulator portion 23. Flow meter 25 includes a base 67 located at inlet end 27. A passage 69 extends through base 67 and terminates at opposite, generally transverse surfaces 81, 84 of base 67. Passage 69 has an opening 83 on surface 81 of base 67. Passage 69 receives gas which has been delivered through the regulator portion 23 to its end 65 at the predetermined regulated pressure.

Flow meter 25 includes structures for selectively varying the flow rate of the gas passing through flow meter 25. A ring 71 is located adjacent to base 67 along the longitudinal axis 57 and rotatable relative to base 67. Ring 71 has a pair of opposite, substantially planar surfaces 73, 75 and a series of apertures or orifices 77 of varying sizes extend through ring 71 between surfaces 73, 75. The respective orifices 77 are angularly spaced around ring 71.

Ring 71 has a central ring aperture 79 on the longitudinal axis 57 and ring 71 rotates about longitudinal axis 57 relative to base 67. Surface 73 of ring 71 faces or opposes surface 81 of base 67. The orifices 77 are located on ring 71 at a radial distance (indicated by arrows A in FIG. 2) which corresponds to the radial location of opening 83 of passage 69 in base 67. In this way, a selected one of the orifices 77 can be positioned in alignment with opening 83 of passage 69, and gas flows from passage 69 through such selected one of orifices 77.

The interface between opening 83 or passage 69 and the aligned one of orifices 77 is sealed to prevent escape of gas between the opposing surfaces 73, 81. The seal is preferably accomplished by means of an O-ring 85 surrounding opening 83 and the opposing, aligned one of the orifices 77. O-ring 85 is preferably made of a resiliently compressible material and protrudes slightly from the plane of base surface 81 such that O-ring 85 is compressed by ring 72.

Also protruding from base surface 81 are two compressible buttons 87 which are preferably symmetrically located at locations angularly spaced from opening 83. Buttons 87 are spring mounted within corresponding cavities 89 in base surface 81. Springs 88 bias buttons 87 outwardly from base surface 81. Buttons 87 are located to protrude from base surface 81 at a radial distance A corresponding to the radial location of the orifices 77. In this way, buttons 87 provide a detent or indexing feature to aid in positively positioning the selected one of orifices 77 in alignment with opening 83 in passage 69 of base 67. More specifically, leading into each of the orifices 77 is a chamfered portion 91. When one of the orifices 77 aligns with a corresponding one of the buttons 87, the arcuate outer surface 93 of the button 87 is received in the corresponding chamfered portion 91. Springs 88 (one being shown) bias buttons 87 to engage portion 91 or allow buttons 87 to retract when not aligned with an orifice 77. In this way, when the ring 71 is rotated relative to base 67 to select a desired flow rate, buttons 87 "click" into corresponding orifices 77 as the orifices align with buttons 87, namely when another one of orifices 77 is correctly aligned with passage 69. The "clicking" gives users a physical indication that the selected one of orifices 77 is correctly positioned.

A cap 95 is mounted at outlet end 29 of flow meter 25 and is located longitudinally adjacent to ring 71. Cap 95 includes an inner surface 97 sealed to outlet end 29, such as by O-ring 99, to form a chamber 101 which, in part, extends between inner surface 97 of cap 95 and opposing surface 75 of ring 71. Cap 95 has an outer surface 103 and a central longitudinal hole 105 extending between outer and inner surfaces 103, 97.

Cap 95 engages ring 71 and is rotatable therewith by means of a pin 107 extending from ring surface 75, received in corresponding slot 109 on opposing inner cap surface 97. The interengagement of cap 95 and ring 71 allows the selective rotation of cap 95 to rotate ring 71 and position a predetermined one of orifices 77 in alignment with passage 69.

Spool 37 extends through hole 105 of cap 95 and ring aperture 79 of ring 71, and end 45 of the spool is threadably received in corresponding bore 111 of base 67. When spool 37 is fully received into bore 111, transverse wall 53 of spool 37 seats against edge 115 of bore 111 (see FIG. 3). Shoulder 39 of spool 37 is structured so that transverse wall 53 abuts surface 75 of ring 71, thereby limiting outward longitudinal displacement of ring 71 relative to base 67. Transverse wall 53 also biases ring 71 toward base 67 and against the resilience of 0-ring 85 and spring biased buttons 87. Transverse wall 53 thus maintains a sealing engagement between opening 83 and the aligned one of orifices 77 and also inhibits outward, longitudinal movement of ring 71 away from base 67 which could potentially disrupt the seal.

Although ring 71 is biased against O-ring 85 and buttons 87, ring 71 remains readily manually rotatable relative to base 67 upon rotation of cap 95. O-ring 85, buttons 87, and associated springs 88 are sized and selected so that, when ring 71 is biased against them, the counter forces exerted by the compression of O-ring 85 and buttons 87 are substantially symmetrical with respect to longitudinal axis 57. In this way, the resultant counter force of buttons 87 and O-ring 85 acts substantially along axis 57. In other words, the force of annular transverse wall 53 biasing ring 71 toward base 67, and the symmetrical counterforces exerted by buttons 57 and O-ring 85 minimize the presence of moment arms on ring 71, and equalizes forces acting on ring 71 at a radial distance from central longitudinal axis 57. Ring 71 cannot "rock," which also could undesirably disrupt the seal between passage 69 and the aligned one of orifices 77.

Referring to FIGS. 2 and 3, the width or radial dimension of ring 71, namely the difference between its outer ring diameter 125 and its inner ring diameter 123, indicated by Arrows C, is preferably minimized. The ring width need only be sufficient to receive orifices 77 therein, as well as a seat 127 on surface 75, radially inwardly from orifices 77. Seat 127 is biased toward base 67 by transverse wall 53.

Seat 127 is disposed at a radial distance from central axis 57, which positions it as close to the radial locations of orifices 77 as structurally permitted. In this way, transverse wall 53 biases ring 71 toward base 67 at a radial location which is near the counterforces exerted by the resilience of O-ring 85 and buttons 87. Such an arrangement is believed to be especially effective at minimizing "rocking" or force moments on ring 71, especially during its rotation relative to base 67. The location of peripheral sidewall 51 is selected so that peripheral openings 55 are radially adjacent to orifices 77.

Spool 37 includes an annular, outer flange 117 which engages outer cap surface 103 at a location along longitudinal axis 57 so as to rotatably secure cap 95 to flow meter 25. Annular transverse wall 53 and annular outer flange 117 each have flat washers 119 disposed thereon made of polymeric or other material of low friction, thereby easing rotation of ring 71 and cap 95, respectively, relative to transverse wall 53 and flange 117.

In spool 37, the peripheral openings 55 and associated bores 41 are in communication with chamber 101. Passage 26 between opposite ends 27, 29 of flow meter 25 is thus defined by: passage 69 extending through base 67, a selected one of orifices 77 in alignment with opening 83 in passage 69, chamber 101 formed by the sealed inner surface 97 of cap 95, bores 41 through shoulder 39 of spool 37, and orifice 31 in nozzle 49. Gas is thus delivered from regulator portion 23 to inlet end 27 of flow meter 25. From there is flows through passage 26 as just defined and exits nozzle 49 at the desired flow rate.

The flow rate exiting nozzle 49 is substantially determined by the diameter of orifices 77 at their smallest point. As best seen in FIG. 1, there are eleven orifices 77. A twelfth detent position 78 lacks any orifice and corresponds to an "off" position. The diameters for orifices 77 may be chosen to suit any of a variety of medical applications. The orifices can be selected, for example, to allow for incremental flow rates between 0 and 8 liters per minute or between 0 and 15 liters per minute, with the smallest of the orifices having a diameter of about three thousandths of an inch. Whereas the pressure is regulated at the inlet is held constant by the pressure regulator and the flow restriction produced by the chosen orifice is constant, the flow rate is held constant at a given load.

Peripheral sidewall 51 of flow meter 25 includes indicia 121 which can have graduation markings corresponding to the flow rates available from flow meter 25, for example flow rates at a nominal inlet pressure and load, or as a proportion of a maximum flow rate. In particular, the outer peripheral surfaces of base 67 and cap 95 are provided with a scale and arrow, respectively, at opposing edges. The scale on cap 95 rotates relative to the arrow on base 67 to indicate the selected flow rate in a known manner. To select a desired flow rate, the user rotates cap 95 until the index number on cap 95 corresponding to the desired flow rate is aligned with the arrow on base 67. Upon such selection, gas exits nozzle 49 at the selected flow rate, subject to loading.

Apertures 77 can be defined in ring 71 by a variety of suitable means. One such method known in the art involves using copper foil inserts through which appropriately sized holes are formed. Another method involves creating different sized orifices by the relative position of ball bearings or spheres in such orifices. In this embodiment, the ring 71 is made of cast metal. Orifices 77 preferably are drilled between opposite surfaces 73, 75.

Figure 4:
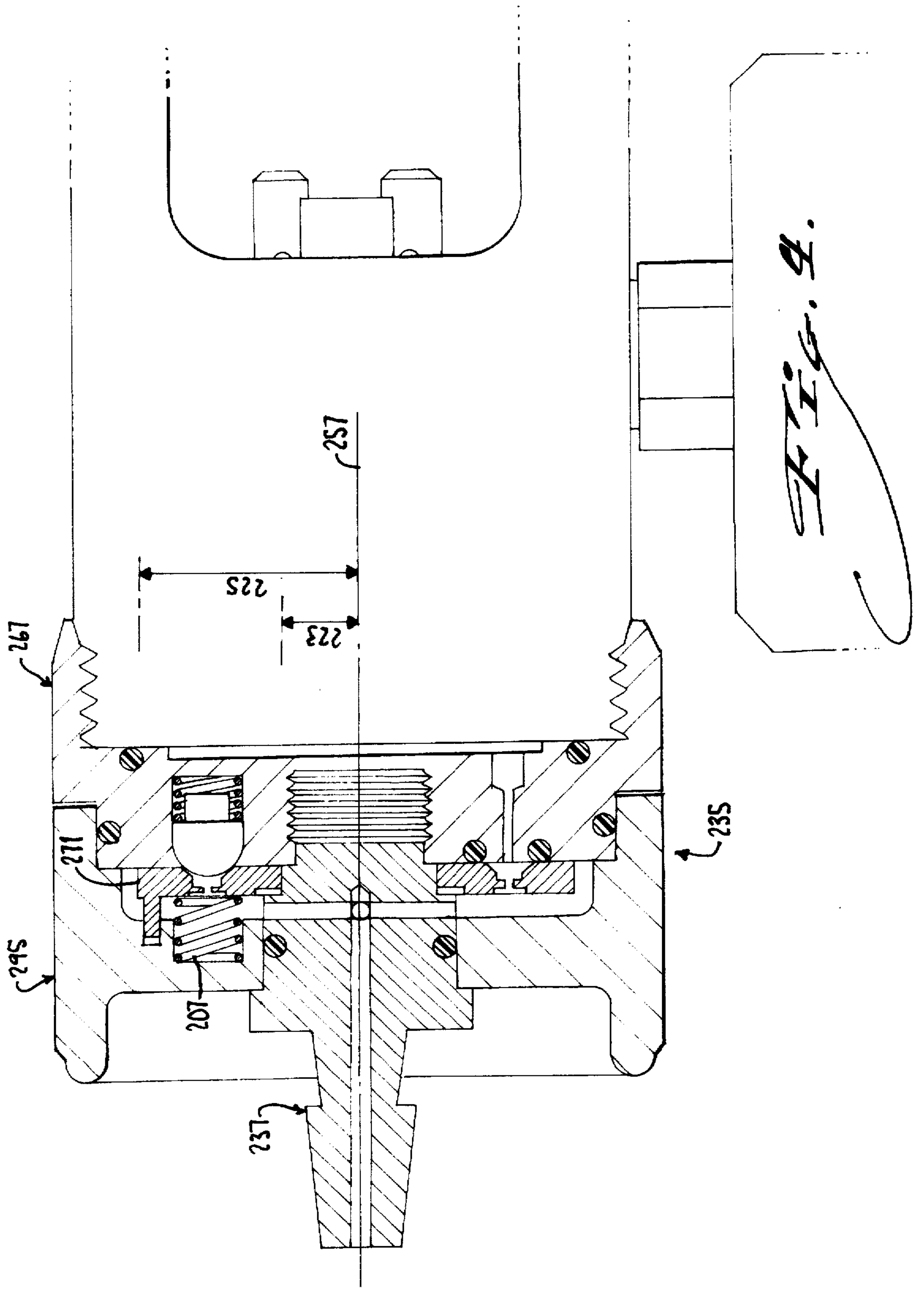
FIG. 4 is a side, sectional view of an alternative embodiment of the invention.

An alternative embodiment of the present invention is shown in FIG. 4. Flow meter 225 includes a base 267, ring 271, cap 295, and spool 237 similar to corresponding elements of the embodiment shown in FIGS. 1–3, except as explained below. Ring 271 is biased toward base 267 by the additional means of three springs 207 (of which one is shown in FIG. 4) interposed between cap 295 and ring 271 at symmetrical angularly spaced locations in relation to central longitudinal axis 257. Inner and outer ring diameters 223, 225, respectively, have been selected so that ring 271 has a width or radial dimension sufficient to allow end of helical spring 207 to be seated effectively thereon. Springs 207 further stabilize ring 271 against longitudinal force moments which may tend to "rock" ring 271 and disturb the seal between opening 283 and the orifice 77 aligned therewith.

In other respects, the flow meter 225 shown in FIG. 4 operates and is configured substantially as described with reference to the embodiment shown in FIGS. 1–3.

In addition to the advantages apparent from the foregoing description, the flow meter 25 and associated gas pressure regulator 21 are compact in the longitudinal direction. The gas exits the flow meter substantially longitudinally through its transverse outlet end 29, rather than through peripheral sidewall 35 of flow meter 25. Such an arrangement eliminates the need for an orifice and associated fitting to be located along the longitudinal length of the flow meter, thereby decreasing the longitudinal length of the flow meter by an amount at least equal to that otherwise needed to receive the orifice and fitting therein.

As another advantage, having gas at the desired flow rate exit from the end of the flow meter means that, when flexible hosing is connected to the flow meter for delivering the gas to a patient or device, the hosing can be readily oriented to extend transversely outwardly from the peripheral sidewall 35 at any angular position with a minimum of bending or kinking.

The invention having been disclosed in connection with the foregoing variations and examples, additional variations will now be apparent to persons skilled in the art. The invention is not intended to be limited to the variations specifically described above, and accordingly, reference should be made to the appended claims rather than the foregoing discussion of preferred examples to access the scope of the invention in which exclusive rights are claimed.

What is claimed is:

1. A gas pressure regulator comprising:

a regulator portion adapted to connect to a source of pressurized gas at a first end and to deliver the gas at a predetermined pressure at a second end; and a flow meter having means for selectively varying the rate of flow of the delivered gas, the flow meter having an inlet end, an outlet end opposite the inlet end, and a peripheral sidewall extending between the ends, the flow meter having a longitudinal axis, each end having an end surface, the flow meter secured at the inlet end to the second end of the regulator portion, the flow meter having portions defining a passage through which the gas is delivered for use extending between the inlet end and the outlet end, wherein the means for selectively varying the flow rate comprises a cap rotatably mounted to the end surface of the outlet end, the cap having a hole extending through the cap; and wherein the passage through which the gas is delivered extends through the hole in the cap, the passage terminating in an orifice located on the end surface of the outlet end, not at the peripheral sidewall, thereby reducing the length of the flow meter.

2. The regulator of claim 1, wherein the end surface of the outlet end is generally transverse and the regulator portion and the flow meter are secured to each other coaxially, whereby the flow meter extends outwardly from the regulator portion in the longitudinal direction.

3. A gas pressure regulator comprising:

a regulator portion adapted to connect to a source of pressurized gas at a first end and to deliver the gas at a predetermined pressure at a second end; and a flow meter having means for selectively varying the rate of flow of the delivered gas, the flow meter having an inlet end and an outlet end opposite the inlet end, the flow meter having a longitudinal axis, each end having a generally transverse end surface, the flow meter secured at the inlet end to the second end of the regulator portion, the flow meter having portions defining a passage extending between the inlet end and the outlet end, the passage terminating in an orifice located on the end surface of the outlet end;

wherein the flow meter further comprises a spool having a central, longitudinal spool axis and first and second opposite spool ends, the first spool end secured to the flow meter at the outlet end, the second spool end terminating in a nozzle, the spool including a shoulder between the spool ends, the shoulder extending outwardly from the longitudinal spool axis, and wherein the portions defining the sealed passage comprise at least one bore extending through the shoulder and communicating with the nozzle.

4. The regulator of claim 3, wherein the shoulder includes a peripheral sidewall with a peripheral opening therein, and the bore extends from the peripheral opening to the central spool axis.

5. The regulator of claim 4, wherein the shoulder comprises a transverse wall, and wherein the means for selectively varying the flow rate comprises a rotatable ring with first and second opposite substantially planar surfaces and a series of apertures of varying sizes extending between the surfaces, the apertures at angularly spaced locations on the ring, the transverse wall of the shoulder abutting the first planar surface of the ring to limit longitudinal displacement thereof.

6. The regulator of claim 5, wherein the means for selectively varying the flow rate comprises a cap at the outlet end mounted longitudinally adjacent to the ring and engaged with the ring to be rotatable therewith, the cap having inner and outer surfaces, the inner surface sealed to the outlet end of the flow meter to form a chamber which partially extends between the inner surface and the first surface of the ring, the peripheral opening of the bore in communication with the chamber, the cap having a longitudinal hole extending between the outer and inner surfaces, the spool extending through the longitudinal hole of the cap and having an annular flange engaging the outer surface of the cap at the edge of the longitudinal hole to secure the cap to the flow meter.

7. The regulator of claim 3, wherein the spool further comprises a plurality of said bores.

8. A flow meter for a gas pressure regulator comprising:

a plurality of components positioned in line along a longitudinal axis, said components comprising:

a base having portions defining a passage extending through the base and through which the gas flows at regulated pressure;

a ring located adjacent to the base along the longitudinal axis and rotatable relative to the base, the ring having a series of orifices extending through the ring at angularly spaced locations around the axis, the orifices being located on the ring at a radial distance corresponding to the location of the passage in the base, the ring having a central ring aperture;

means for biasing the ring against the base;

a cap having a first portion adjacent to the ring along the longitudinal axis and having a second portion sealed against the base to form a chamber for holding the gas under pressure therein, the chamber having the ring enclosed therein, the cap having a central cap aperture therein, the cap being rotatable relative to the base;

means for interengaging the cap with respect to the ring such that selective rotation of the cap relatively rotates the ring with respect to the passage for positioning a predetermined one of the orifices in alignment with the passage;

means for sealing the predetermined one of the orifices to the passage;

a spool having first and second ends, the first end extending through the ring and the cap apertures, through the chamber, and secured to the base;

a nozzle extending longitudinally at the second end of the spool;

at least one bore extending through the spool and communicating between the nozzle and the chamber to delivery the gas out the longitudinal end of the meter.

9. The flow meter of claim 8, wherein the nozzle is oriented coaxially with the longitudinal axis of the meter.

10. The flow meter of claim 8, wherein the biasing means comprises at least one spring interposed between the cap and the ring.

11. The flow meter of claim 8, wherein the biasing means comprises an annular shoulder extending transversely from the spool and engaging the ring.

12. A gas pressure regulator comprising:

a regulator portion adapted to connect to a source of pressurized gas at a first end and to deliver the gas at a predetermined pressure at a second end; and a flow meter having means for selectively varying the rate of flow of the delivered gas, the flow meter having an inlet end, an outlet end opposite the inlet end, and a peripheral sidewall extending between the ends, the flow meter having a longitudinal axis, each end having a generally transverse end surface, the flow meter secured at the inlet end to the second end of the regulator portion, the flow meter having portions defining a passage extending between the inlet end and the outlet end, the passage terminating in an orifice located on the generally transverse end surface of the outlet end and not on the peripheral sidewall;

wherein the means for selectively varying the flow rate comprises a ring between the inlet and outlet ends of the flow meter, the ring having a set of orifices of varying size extending therethrough, a selected one of the orifices defining a portion of the passage and in substantially sealed engagement therewith, the flow meter having means for maintaining the selected orifice in substantial, sealed engagement with the passage, thereby reducing rocking of the ring in the longitudinal direction and corresponding movement of the selected orifice.

13. The regulator of claim 12, wherein the means for maintaining the orifice in substantial, scaled engagement comprises a generally transverse wall abutting the ring.

14. The regulator of claim 13, wherein the ring includes inner and outer diameters and a ring surface, the ring surface comprising a seat located near the inner diameter, and wherein the transverse wall abuts the seat.

15. The regulator of claim 14, wherein the distance between the seat and the orifices is minimized, the transverse wall thereby exerting force at locations proximate to the orifices on the ring to inhibit the longitudinal movement of the orifices.

* * * * *